(No Model.)
F. DARMSTADT.
SOIL PIPE STOPPER OR CLOSER.
No. 422,739. Patented Mar. 4, 1890.
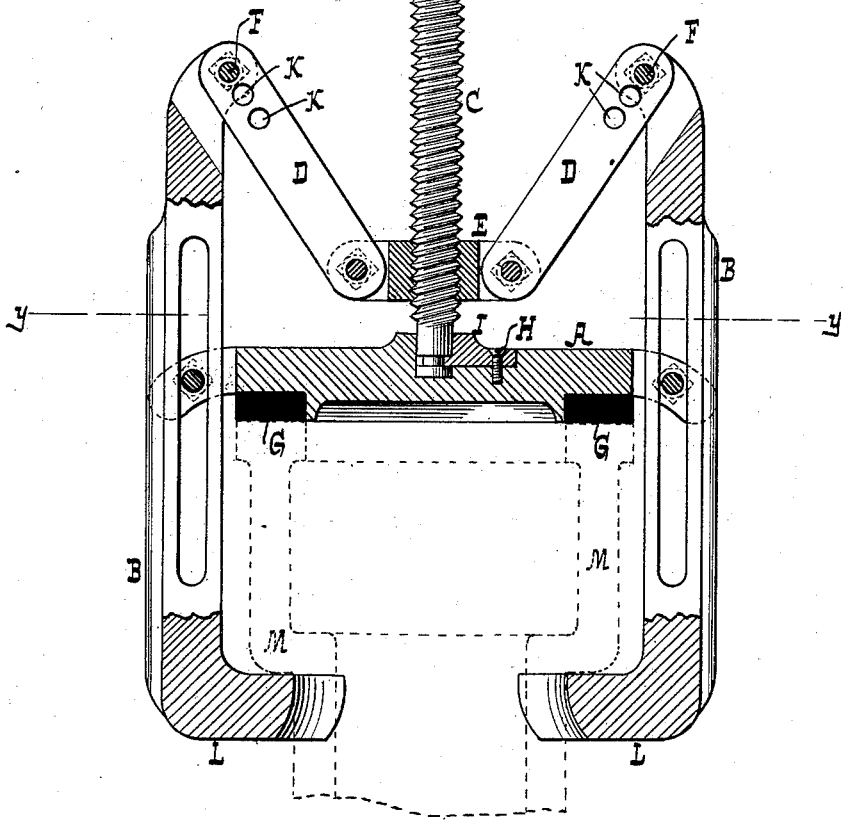
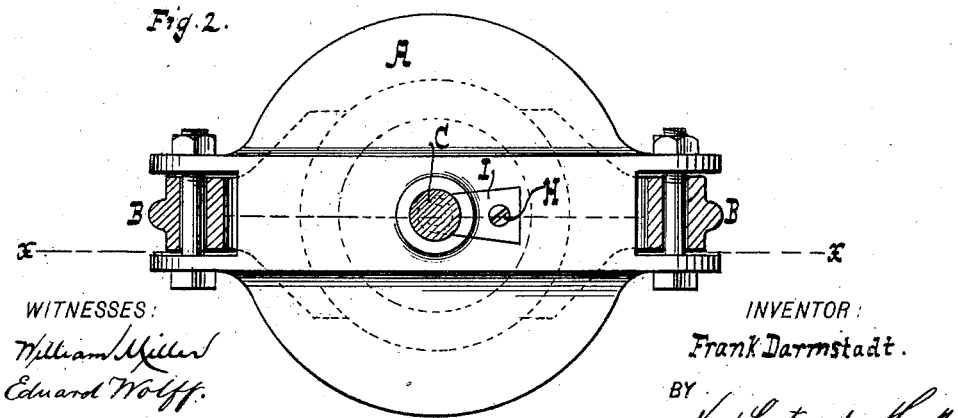
WITNESSES:
William Miller
Edward Wolff.
INVENTOR:
Frank Darmstadt.
BY
Van Santvoord & Hauff,
ATTORNEYS

UNITED STATES PATENT OFFICE.

FRANK DARMSTADT, OF BROOKLYN, NEW YORK.

SOIL-PIPE STOPPER OR CLOSER.

SPECIFICATION forming part of Letters Patent No. 422,739, dated March 4, 1890.

Application filed November 14, 1889. Serial No. 330,367. (No model.)

*To all whom it may concern:*

Be it known that I, FRANK DARMSTADT, a citizen of the United States, residing at Brooklyn, in the county of Kings and State of New York, have invented new and useful Improvements in Soil-Pipe Stoppers or Closers, of which the following is a specification.

This invention relates to a stopper or closer adapted to securely close soil-pipes and other pipes, and which can be readily applied to pipes of different sizes, as set forth in the following specification and claims and illustrated in the accompanying drawings, in which—

Figure 1 is a front elevation of a stopper, partly in section along $x\ x$, Fig. 2. Fig. 2 is a section along $y\ y$, Fig. 1.

In the drawings, the letter A indicates the pipe-stopper or plate for closing the pipe. This plate is guided by the arms B, said arms B being shown slotted, so as to guide suitable arms extending from plate A. To the plate A is connected a spindle or screw-shank C. The nut E is tapped for the passage of shank C, and links D are connected to said nut E and to the arms B. Bolts or pins F are shown as connecting the links D and arms B, and said links D have a series of holes K, so that by placing the bolts F in various holes nearer to or farther from the nut E the arms B will be adjusted to adapt their grasping ends L for larger or smaller pipes.

The plate A has a packing or rubber ring G to enable the pipe M to be securely closed. The spindle C and plate A can be readily separated, if desired, by loosening the screw H and removing the cap or piece I, when the spindle can be withdrawn from the plate.

When the plate A has been placed on a pipe and the arms B are in position, as shown in Fig. 1, the spindle C is turned, so as to press the plate A against the pipe. This motion of the spindle forces the nut E away from the plate A, and actuates the links D, so as to swing the arms B and press their ends L with a tight grip against the pipe M. The stopper is thus firmly secured to the pipe.

What I claim as new, and desire to secure by Letters Patent, is—

1. The combination, with a plate or pipe-stopper A, of guiding-arms B for said stopper, an actuating-screw C for said stopper, and links D, connected to said arms and to the screw for clamping the arms to the pipe, substantially as described.

2. The combination, with the plate or pipe-stopper A, the guiding-arms B, and the screw C for actuating said stopper, of the nut E and the links D, adjustably connected with said arms, substantially as described.

In testimony whereof I have hereunto set my hand in the presence of two subscribing witnesses.

FRANK DARMSTADT.

Witnesses:
 J. VAN SANTVOORD,
 JAS. L. NORRIS.